United States Patent [19]

Uhlig

[11] 3,941,542

[45] *Mar. 2, 1976

[54] APPARATUS FOR BLOW MOLDING PLASTIC ARTICLES

[75] Inventor: Albert R. Uhlig, Toledo, Ohio

[73] Assignee: Owens-Illinois, Inc., Toledo, Ohio

[ * ] Notice: The portion of the term of this patent subsequent to Dec. 25, 1990, has been disclaimed.

[22] Filed: Aug. 22, 1973

[21] Appl. No.: 390,551

Related U.S. Application Data

[63] Continuation of Ser. No. 110,685, Jan. 28, 1971, Pat. No. 3,781,395.

[52] U.S. Cl...... 425/326 B; 425/342; 425/DIG. 216
[51] Int. Cl.²........................................ B29C 17/07
[58] Field of Search ... 425/326 B, 387 B, DIG. 216, 425/342; 264/96, 98, 99

[56] References Cited
UNITED STATES PATENTS

| | | | |
|---|---|---|---|
| 2,715,751 | 8/1955 | Weber | 425/340 X |
| 2,919,462 | 1/1960 | Friden | 264/99 |
| 3,439,380 | 4/1969 | Seefluth | 425/DIG. 216 |
| 3,470,282 | 9/1969 | Scalora | 425/326 B |
| 3,632,261 | 1/1972 | Gasior | 425/342 X |
| 3,781,395 | 12/1973 | Uhlig | 425/326 B |
| 3,806,587 | 4/1974 | Turner | 425/DIG. 216 |

FOREIGN PATENTS OR APPLICATIONS

| | | |
|---|---|---|
| 795,543 | 8/1973 | Belgium |
| 1,147,118 | 4/1969 | United Kingdom |

*Primary Examiner*—Harold D. Whitehead
*Assistant Examiner*—K. J. Ramsey
*Attorney, Agent, or Firm*—Philip M. Rice; E. J. Holler

[57] ABSTRACT

This application discloses a method of and apparatus for blow molding plastic articles in two blowing stages. A freely extruded pendant tubular parison is first blown into a pre-form, then the pre-form, while at a temperature most conducive to orientation, is blown to its final configuration. By performing certain operations on the pre-form prior to the final blowing step, improved products can be made. For example, by pinching shut a portion of the pre-form, handled containers can be made on a free extrusion blow molding machine. By stretching the pre-form prior to final blowing, containers of increased top-load or stacking capability can be made.

4 Claims, 15 Drawing Figures

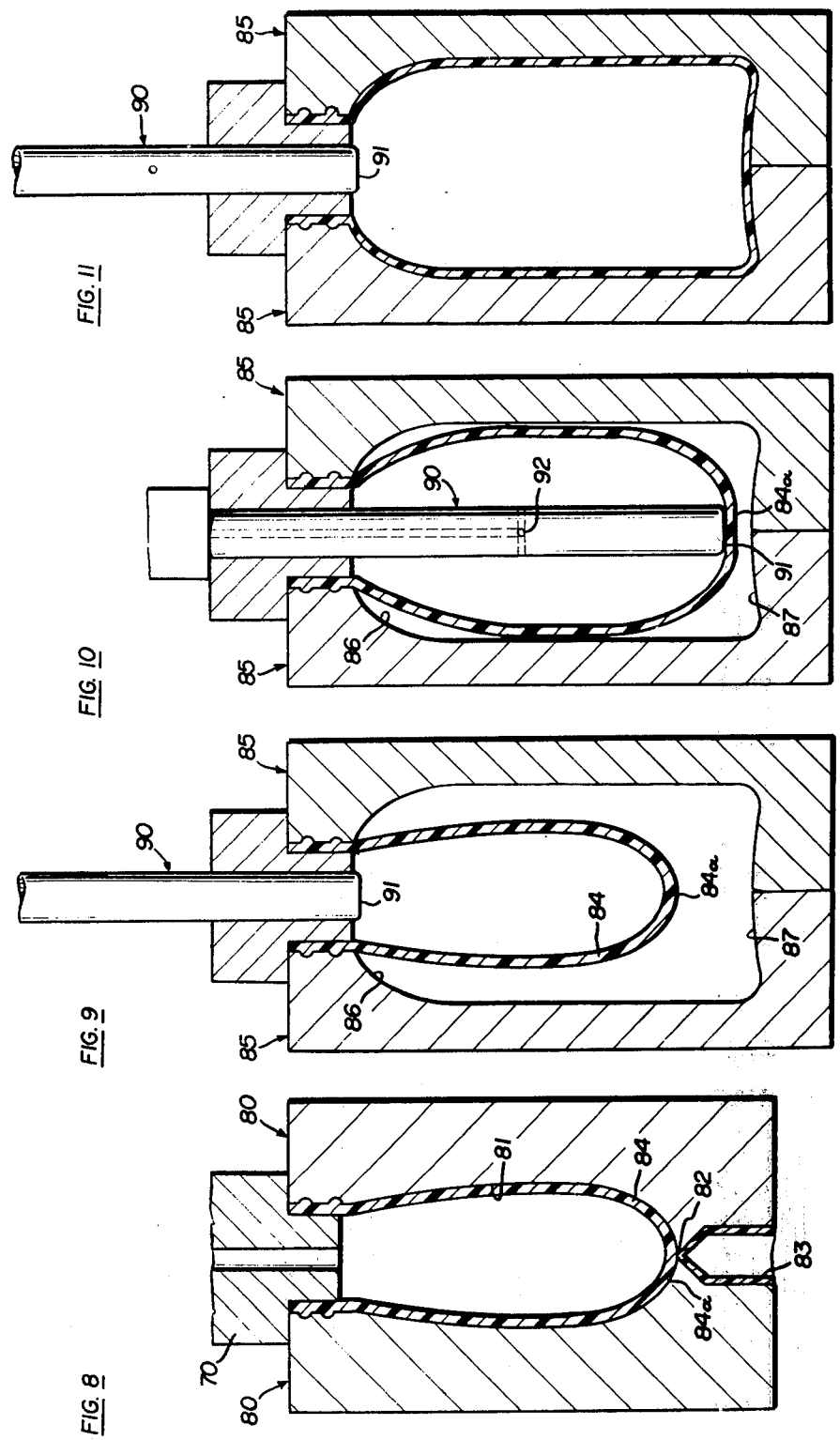

APPARATUS FOR BLOW MOLDING PLASTIC ARTICLES

BACKGROUND OF THE INVENTION

This application is a continuation application of Ser. No. 110,685, filed Jan. 28, 1971.

In the manufacture of blow molded thermoplastic articles, such as containers or the like, so called "free extrusion" blow molding machines has long been utilized. Such machines typically issue a freely pendant, extruded tubular formation of plastic which is engaged by a mold closed on the tube immediately adjacent the orifice. The closure of the mold pinches the tube shut to form a blowable bubble. Typically, the mold-engaged, blowable bubble is moved away from the orifice, and the bubble is simply inflated or "blown" to the configuration of the blow mold.

While this type of operation is perfectly suitable for the manufacture of bottles or other containers of simple, essentially cylindrical shape, this method is ill adapted to the manufacture of handled containers, such as jugs, or the like. Such containers, generally, are large (on the order of one quart to one gallon in size) and the handle generally is located adjacent the shoulder of the container. To manufacture containers of this size on a free extrusion machine, the blowable bubble must be of sufficient size to be pinched shut by closure of the blow mold at the location of the handle. The extrusion of such a large tube necessarily results in the formation of large quantities of "flash" or waste material at the exterior of the blown shape. This flash (1) must be removed and reground at substantial expense, (2) requires either substantial hand labor or substantial trimming machine investment for its removal, and (3) results in leakage from the container if improperly removed. All in all, substantial problems are involved in the manufacture of relatively large, handled containers from free extrusion blow molding machines, and such machines are not utilized for this purpose to any appreciable extent.

In my earlier filed U.S. application Ser. No. 103,624, filed Jan. 4, 1971 (D.N. 1364), I have proposed successively blow molding a freely extruded tubular parison into a pre-form and then into a final blown article. In this way, substantial process advantages are obtained, the formation of the pre-form conditions the thermoplastic material for maximum biaxial orientation during the final blowing step, and final blown articles of enhanced physical characteristics are obtained. Normally, such a process as described in my earlier application substantially uniformly expands the pre-form into the final container. However, in the manufacture of containers or other blown articles, such as handled bottles, it would be preferable to perform additional pre-form steps while the pre-form is in a condition most conductive to orientation, i.e., while the pre-form is at that temperature at which orientation best occurs. Such additional pre-forming steps are carried out by the present invention.

BRIEF DESCRIPTION OF THE PRESENT INVENTION

The present invention carries the method of my above-identified application to a further stage by pre-forming certain additional pre-forming steps over and above simply blowing the initial parison into a pre-form prior to blowing the pre-form at the desired temperature for orientation.

For example, the present invention proposes the blowing of the pre-form to a shape adaptable for the manufacture of handled containers by providing a bulbous enlargement or the like at the location of the handle, which enlargement is of a size to fit within the final blow mold without the formation of external flash. This bulbous enlargement then is pinched shut prior to the final blowing step to provide the hand hole located next to the handle and to form the handle-defining blank which is subsequently blown into the handle itself. This additional forming step may be performed in several different ways. Most advantageously, it can be performed during the closure of the final blow mold on to the pre-form, and this is the version of the method which is specifically illustrated and described herein.

Another preforming step of this character can be performed by stretching the pre-form prior to blowing, so that specific orientation and strengthening in a specific direction can be obtained. For example, the blown pre-form can be stretched in the direction of the height of the container so that the pre-form is specifically oriented in a vertical direction prior to blowing. After blowing, the resultant container has increased strength in the direction of orientation, thus increasing the top-load or stacking capability of the container. This specific method is also illustrated and described in the specification.

The apparatus of the present invention is adapted to carry out the method as above described. Essentially, the blow molds are provided with specific structure for performing additional steps on the pre-form. For example, the final blow mold is provided with inserts for pinching shut that portion of the pre-form which will form the handle of the final container. If necessary, additional heating means are provided to insure the welding together of the pinched portions of the pre-form. Another example is the provision of portions of the blow mold to engage the pre-form and to stretch the pre-form in a direction corresponding to the height of the final container to obtain additional vertical orientation in the pre-form prior to blowing.

It is, therefore, an important object of the present invention to provide an improved method of and apparatus for blow molding articles from a thermoplastic material through successive blowing operations to form first a pre-form and then the final blown article, and performing additional pre-forming steps intermediate the two blowing steps.

Another important object of this invention is the provision of an improved method and apparatus for the blow molding of thermoplastic articles from a freely pendant tubular parison by blowing the parison into a pre-form, and conditioning the pre-form while at a temperature most conductive to orientation prior to final blowing of the article, so that the final article has certain desired characteristics.

It is a further important object of this invention to provide a method of making a handled container from a freely extruded pendant tube by blowing the tube into a pre-form having a specific portion adapted to define the handle in the final container and pinching shut the specific portion of the pre-form prior to final blowing, the specific handle-defining portion of the pre-form being completely enclosed within the final blow mold during blowing.

Yet another, and no less important object of the present invention is the provision of a method and apparatus for making a container of enhanced unidirectional strength from a freely extruded, pendant tube by blowing the tube into a pre-form at a temperature most conducive to orientation, stretching the pre-form in the direction of enhanced strength, and then blowing the pre-form while the blown and stretched pre-form remains at its orienting temperature.

Other and further objects of the present invention will be apparent from the following disclosure and claims.

ON THE DRAWINGS

FIGS. 8 through 11 are somewhat schematic cross-sectional illustrations, with parts in elevation, illustrating the successive steps of a modified method of the present invention, and the apparatus for carrying out this method; and FIGS. 12 through 15 are somewhat schematic illustrations, similar to FIGS. 8 through 11, illustrating three successive steps of yet another method of the present invention, and the apparatus for carrying out this method.

AS SHOWN ON THE DRAWINGS

Figure 1:
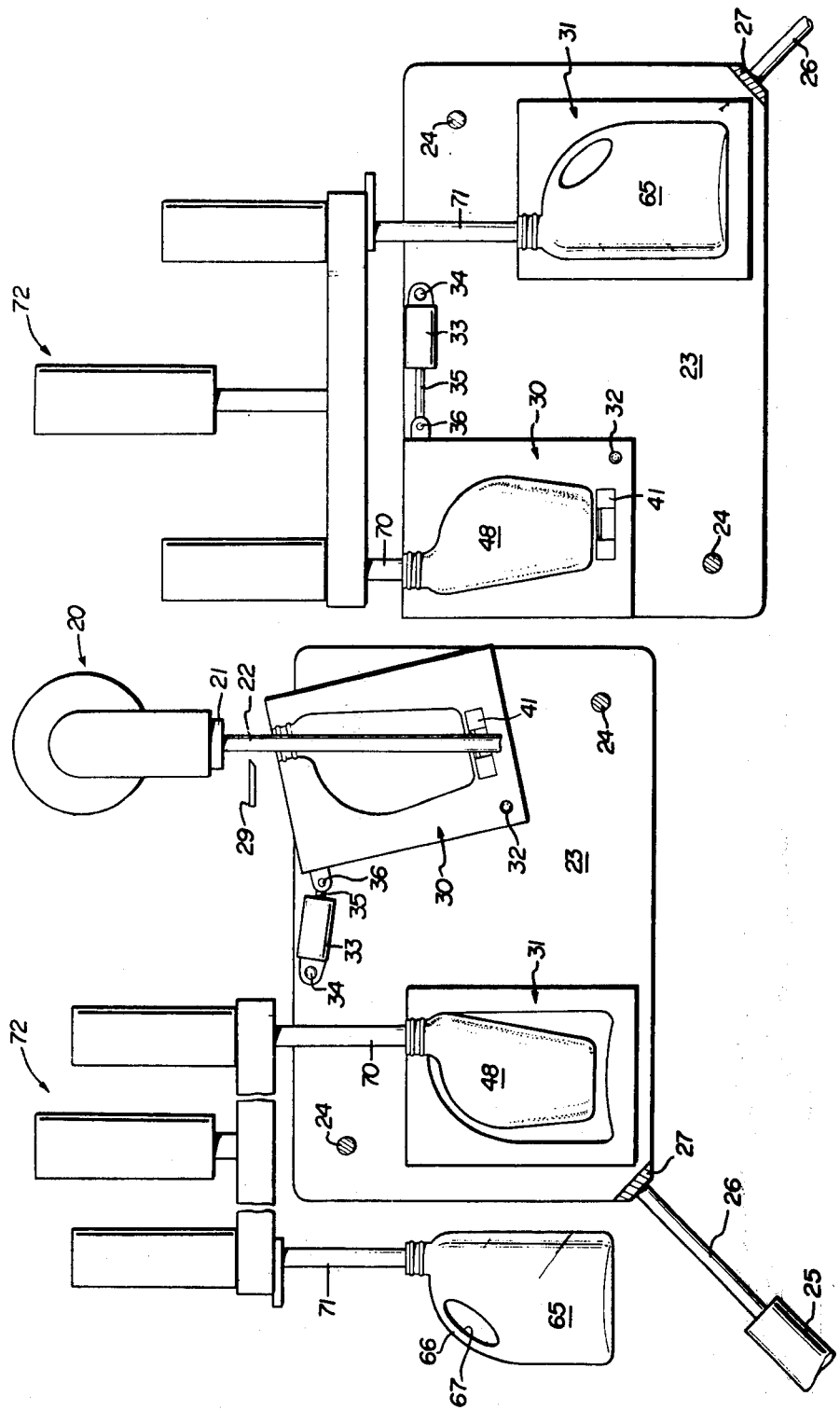
FIG. 1 is a diagrammatic representation, with parts shown in section, of a blow molding machine of the present invention adapted to carry out one embodiment of the method of the present invention.

In FIG. 1, there is illustrated a free extrusion blow molding machine similar to that illustrated and described in my earlier application, Ser. No. 103,624, filed in the United States on Jan. 4, 1971 (D.N. 1364).

It is unnecessary here to repeat all of the structural and functional details of the apparatus of FIG. 1, particularly since the disclosure of my above-identified pending application is incorporated herein by reference.

Referring now to the machine of FIG. 1, reference numeral 20 refers generally to a screw-type extruder having a downwardly directed annular orifice structure indicated at 21, from which issues a parison 22 in the form of a continuous tube. Located generally beneath the extruder 20 and movable laterally and vertically relative thereto are two sets of mold support side plates 23 (only one plate of each set being shown) these side plates 23 are arranged in pairs, each pair being joined by transverse rods 24 for transverse sliding motion relative to one another.

Each set of the side plates 23 is actuated toward and away from the extruder 20 by an inclined actuating cylinder 25 having a piston rod 26 secured to the side plates 23, or more specifically to the carrying mechanism for the slide plates 23, by a transverse mounting number 27. As disclosed in my earlier, above-identified application, and as shown in FIG. 1 herein, two pairs of nold side plates 23 are provided and these pairs of side plates are alternately movable toward and away from the orifice 21.

Figure 6:
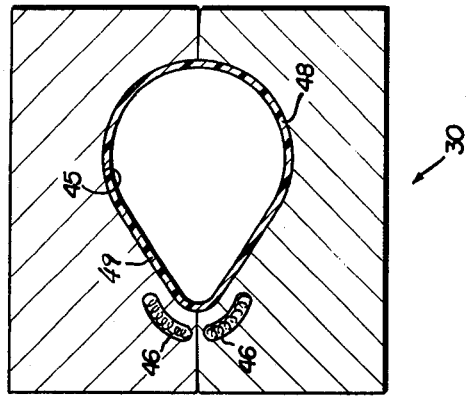
FIG. 6 is a sectional view taken along the plane 6—6 of FIG. 3.
Figure 5:
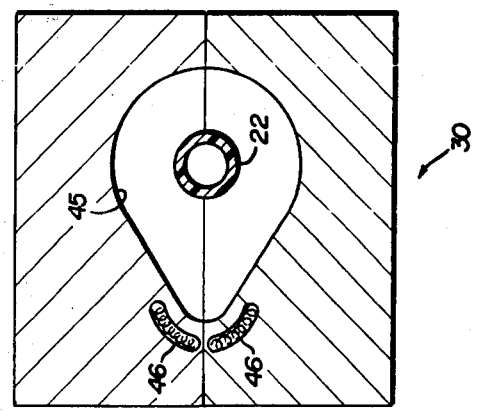
FIG. 5 is a sectional view taken along the plane 5—5 of FIG. 2.

Each side plate 23 carries a pre-form mold half 30 and a final blow mold half 31. The movement of the side plates 23 of each pair toward and away from one another (by means shown in my earlier application) simultaneously opens and closes the pre-form blow mold halves 30 and the final blow mold halves 31. The pre-blow mold halves are illustrated in their closed positions in FIGS. 5 and 6 and the final blow mold halves 31 are illustrated in their closed positions in FIG. 7.

The final blow mold halves 31 are fixed to the plates 23, respectively, by suitable means (not shown), while the pre-form blow mold halves 30 are each secured to their respective nold plate 23 for relative tilting movement. More specifically, the best shown in FIG. 1, each pre-form blow mold half 30 is secured to its mold plate 23 by means of a lower pivot pin 32. The upper portion of each pre-form blow mold half 30 is attached to the plate through an actuating cylinder 33 pivoted to the plate, as at 34, and having its actuating rod 35 pivotally connected to the pre-form blow mold half, as at 36. As shown in FIG. 1, retraction of the actuating rod 35 by actuating of the cylinder 33 will tilt the pre-form blow mold half 30 relative to the plate 23 for a purpose to be hereinafter more fully described.

Figure 2:
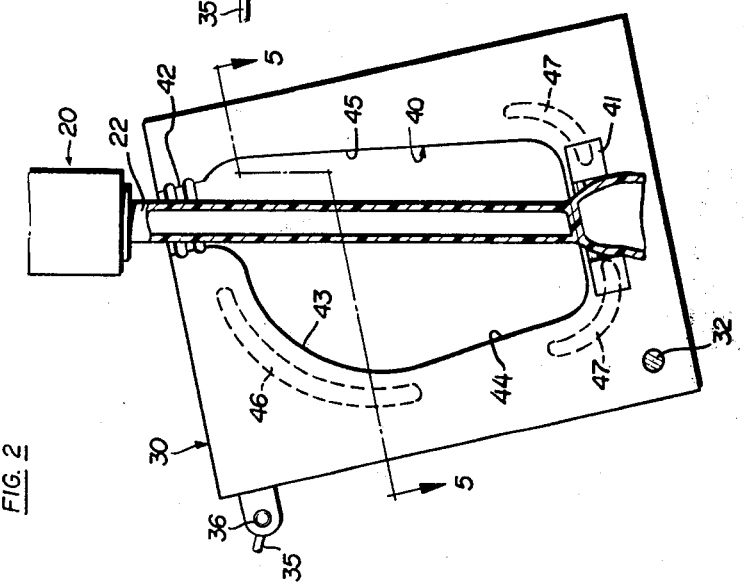
FIG. 2 is an enlarged fragmentary view of a portion of the machine of FIG. 1 illustrating an initial step in the method of the present invention.
Figure 3:
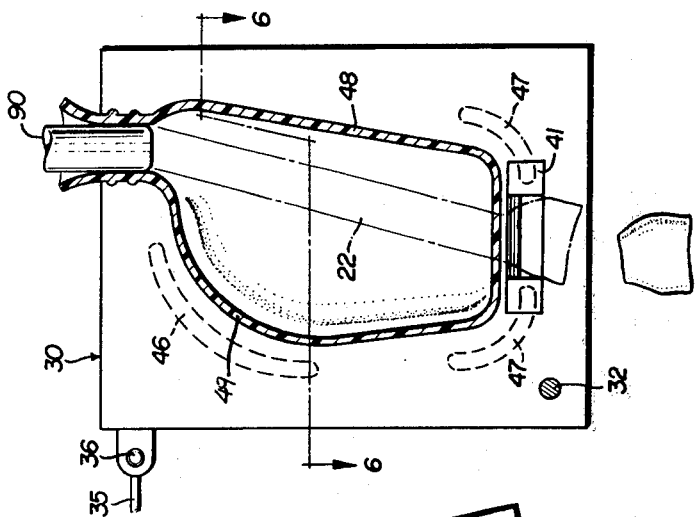
FIG. 3 is an enlarged view similar to FIG. 2 showing a later step in the method of the present invention.

As best shown in detail in FIGS. 2 and 3, the pre-form blow mold halves 30 cooperate to define an interior pre-form mold cavity 40. This mold cavity 40 has at its lower portion a pair of movable "tail-pulling" elements 41, described in detail in my above-identified earlier application, and an upper neck-defining portion 42 of conventional design. The mold cavity portion between the tail-pulling elements 41 and the neck forming portion 42 is actually a blow mold cavity which conforms more closely to the shape of the final container than does the extruded tube 22.

The mold cavity 40 includes a bulbous, laterally extending portion 43 which tapers laterally (FIGS. 2, 3, 5 and 6), the portion 43 conforming generally to the shape of the handle portion of the final container (FIG. 4), the mold cavity tapering downwardly, as at 44, from the bulbous portion 43 toward the lower tube-pinching elements 41 of the blow cavity 40. That portion of the mold cavity 40 remote from the bulbous portion 43 and indicated at 45 also tapers downwardly and inwardly toward the lower tail-engaging portions of the cavity.

Preferably, the pre-form blow mold halves 30 are each provided with embedded heat exchange elements 46 and 47 located, respectively, at the bulbous portion 43 of the mold cavity 40 and at the lower corners or "heel-defining" portions of the pre-form blow mold. These heat exchange elements may be imbedded electrical heaters, coils for circulating a heat exchange fluid, or the like. The purpose of these heat exchange elements 46, 47 will be hereafter described in greater detail.

Figure 4:
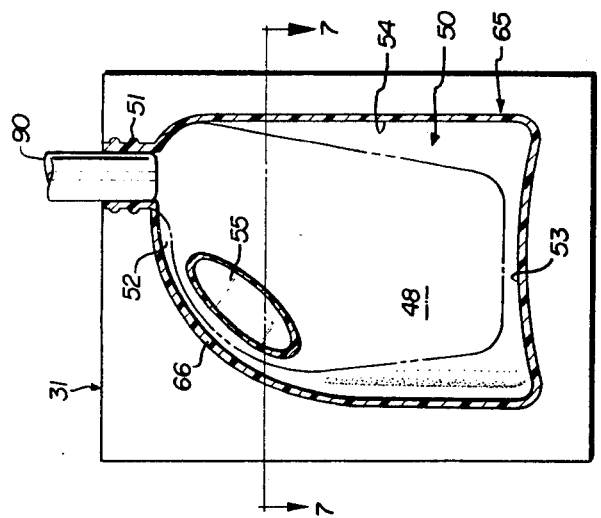
FIG. 4 is an enlarged view similar to FIGS. 2 and 3 further illustrating a later step in the method of the present invention.
Figure 7:
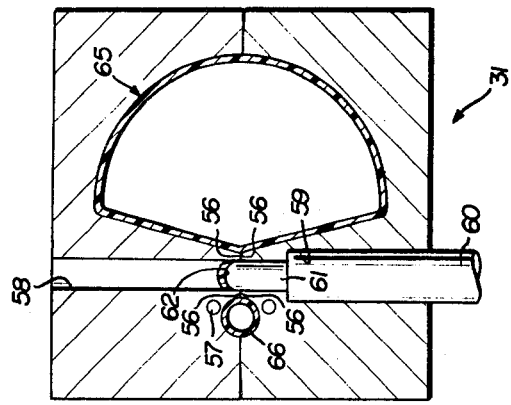
FIG. 7 is a sectional view taken along the plane 7—7 of FIG. 4.

Again referring to FIG. 1 of the drawings and to FIGS. 4 and 7, it will be seen that the final blow mold sections 31 cooperably define an interior mold cavity 50 which conforms in all particulars to the final article to be formed. More specifically, the final blow mold cavity includes an upper neck-defining portion 51, a bulbous laterally extending portion 52 encompassing the handle of the container, and lower arcuate bottom portion 53 which is tail-free and a substantially linear vertical side portion 54 generally opposite the arcuate handle-defining portion 52. Located generally at the handle-defining portion 52 and inwardly from the side walls thereof by a pair of protruding projections or mold inserts 55 which project into the blow mold cavity. These projections 55 are adapted to engage the bulbous or the protruding portion 49 of the pre-form 48 which was formed at the pre-form blow mold cavity portion 43, which portion forms the handle of the final container.

Referring to FIG. 7 of the drawings, it will be seen that these projections 55 have end faces 56 which engage the pre-form and pinch the pre-form shut in the region of the protruding portion 49 of the pre-form 48 formed in the pre-form mold section 43 to define the hand hole of the final handle article. By so engaging and pinching shut the corresponding portion 49 of the pre-form, that portion of the pre-form lying outwardly of the surfaces 46 remains open and in full communication with the remainder of the pre-form. The bulbous portion of the pre-form formed at the portion 43 of the pre-form blow mold cavity 40 is carefully sized and correlated with the final size and configuration of the finished bottle so that the bulbous portion 49 of the pre-form 48 lies inwardly of the handle-defining portion 52 of the final blow mold cavity 50, but outwardly of the surfaces 56 which pinch shut the bulbous portion of the pre-form.

The specific size and shape of the pinching projections 56 can be readily seen from FIG. 7. Further, from FIG. 7 it will be seen that additional heating elements 57 may be provided immediately adjacent the pinch-off projections 56 if necessary or desired, for purpose to be hereinafter more fully described.

The final blow mold halves 31 are also provided with communicating transverse passages 58 and 59 which are aligned with one another and which are located between the abutment surfaces 56. Passage 58 is open, while the passage 59 has positioned therein a guide tube 60 through which a flash-engaging projection 61 extends. Flash-engaging projection 61 has an end surface 62 which is arcuate and which is adapted to engage the flash or waste material pinched between the surfaces 56 upon closure of the blow mold sections 31 upon the blown pre-form 48. Actuation of the projection 61 by suitable means (not shown) will move the projection into the passage 58, pushing the pinched-off flash before it through the passage 58 for ejection from the blow mold sections 31. This type of operation is illustrated and described in detail in U.S. Pat. No. 3,362,043.

From a study of FIGS. 4 and 7, it will be seen that the final blow molded container 65 is of the exact configuration of the final container, this blow molded container 65 having a finished neck, and an integral handle portion 66 which is flash free and which encompasses, at least partially, the opening or hand hole 67 (FIG. 1) formed by the pinching projections 56 and from which the flash is removed by the projection 61, as heretofore described.

Turning now to the method of the present invention in greater detail, and referring specifically to FIG. 1 of the drawings, it will be apparent that the apparatus of the present invention operates in general accordance with the disclosure of my above-identified earlier application Ser. No. 103,624.

More specifically, the two sets of side mold plates 23 are initially positioned as illustrated in FIG. 1, the initial tubular parison 22 issuing downwardly from the orifice 21 intermediate the opened pre-form blow mold sections 30. These pre-form blow mold sections 30 are preferably tilted in a counterclockwise direction for retraction of the cylinder 33, as shown in FIG. 1. By so tilting the molds 30, better distribution of the material from the tubular parison 22 interiorly of the final article is obtained. It will be seen that the neck or finish of the final container is not located centrally of the container, but rather is displaced to one side. By tilting the pre-form mold sections 30, the tube 22 is aligned with both the off-center finish of the container and the centrally located bottom of the container, and the axis of the parison more nearly coincides with the axis of the finished container. The result is better distribution of material into the final container, without the necessity of complicated neck shifting arrangements or other compensating mechanisms which have been proposed in prior machines.

While the one set of mold plates 23 is positioned at the orifice to align the pre-form blow mold sections 30 with the tubular parison 22, the other set of mold plates 23 is in its blowing position. This arrangement of the two sets of mold plates 23 has been described in my early application and need not be repeated here. Also disclosed in my earlier application is the utilization of a pair of individually actuated blow tubes 70, 71 for each set of mold plates 23, these blow tubes 70, 71 being spaced in conformity with the spacing between the pre-form blow molds 30 and the final blow molds 31, as will be readily seen from FIG. 1. The actuating mechanism for these blow pipes is indicated on FIG. 1 by reference numeral 72, the blow tubes, in essence, being individually vertically movable, with the blow tube 70, serving to inflate the tubular parison 22 interiorly of the pre-form blow mold sections 30 and also serving to retain the preblown shape 48 in position intermediate the side plates 23 for transfer to the final blow mold sections 31. The other blow tube 71 serves to inflate the pre-form 48 interiorly of the final blow mold sections 31, and the blow tube 71 also serves to retain the final blown shape 65 exteriorly of the mold plates when the blow mold sections 31 are opened and the mold plates 23 are moved, as shown on the left in FIG. 1. Retraction of the blow tube 71 also serves to strip the finished container 65 from the blow tube, to fall clear of the remainder of the apparatus, also as described in my earlier application.

Returning now to the method of the present invention, it will be seen that closure of the mold sections 30 will pinch shut the extruded tube 22, as best shown in FIG. 2. This closure of the mold sections 30 is carried out by moving the side plates 23 toward one another, and this motion also encloses the previously blown pre-form 48 in the final blow mold sections 31.

Next, the knife 29 is actuated to sever the tube 22 intermediate the closed pre-form blow mold sections 30 and the orifice. The cylinder 25 is then actuated to move the side plates 23 downwardly and to the left, such motion occurring after the retraction of the blow pipes 70, 71 as described in my earlier application. Before or during such transfer, the cylinder 33 is preferably actuated to pivotally move the pre-form blow mold sections 30 from their tilted positions of FIG. 2 to their upright positions of FIG. 3 and 4.

The motion of the side plates 23 upon actuation of the cylinders 25 aligns the open end of the tubular parison 22 with the blow pipe 70, and the blow pipe is lowered into the upper open end of the tube. At the same time, the blow pipe 71 is inserted into the blown pre-form 48 enclosed within the final blow mold sections 31. Preferably, the tubular parison 22 and the pre-form 48 are simultaneously blown to the shape of their respective mold cavities. This blowing operation is illustrated in FIG. 1 as being carried out in the right hand set of blow mold halves 30, 31.

During the blowing of the pre-form and the final article between the left hand pair of plates 23, the right hand pair of plates 23 are opened, the pre-form is retained on its blow pin 70 and the final article is retained on its blow pin 71, the plates 23 are indexed upwardly and to the left to move the pre-blow mold sections 30 into alignment with the next extruded segment of the tube 22 and to move the pre-blown shape 48 into alignment with the final blow mold sections 23. At or about the same time, the final blown shape 65 is stripped from its blow tube 71. Subsequently, the mold plates 23 are advanced toward one another to carry out the operations already described in connection with the left hand pair of mold plates 23. This completely overlapped operation and its functional and economic advantages are fully set forth in my earlier filed method application.

Returning now to the blowing operations carried out with the left hand set of plates 23, it will be seen from FIG. 3 that the tubular parison (formed from the tube 22 pinched shut between the tail-removing inserts 41) is inflated to the configuration of the pre-form blow mold cavity 40. The pre-form 48 is, of course, chilled by its contact with the chilling walls of the mold sections 30, such chilling proceeding until the pre-form approaches that temperature at which it is best adapted for biaxial orientation, also as explained in my earlier patent application.

Of particular interest is the chilling of the bulbous portion 49 formed at the surface 43 of the pre-form blow molds 30. This portion of the pre-form is inflated to the greatest extent and the wall thickness thereof is accordingly somewhat reduced. Further, the extended surface area provided at this region of the pre-form may well more rapidly chill this portion of the pre-form than other, thicker portions of the pre-form.

To prevent overchilling of this portion of the pre-form, the heat exchange elements 46 are provided immediately adjacent thereto. Although the tube, in the case of polyethylene, may well be at a temperature of about 400° F, the best or most advantageous orientation temperature for high density polyethylene is on the order of 230° to 270° F. By maintaining a temperature in the region of 270° F at the surface 43, by use of the heat exchange element 46, the temperature suitable for orientation can be maintained in the bulbous portion 49 of the pre-form. The definition of "heating" or "cooling" is relative, and the temperature of the heat exchange element 46 is less than the temperature of the initially extruded tube 22. Thus, the heat exchange element is cooling with respect to the initial temperature of the tubular parison. On the other hand, the temperature of the heating element 46 may well be greater than that of the blown bulbous portion of the pre-form as it lies against surface 43, so the heat exchange element 46 may be heating the plastic surface.

In either way, the heat exchanger 46 is intended to and utilized for maintaining this portion of the pre-form at that temperature most conducive to biaxial orientation upon subsequent inflation.

Similarly, the heat exchange elements 47 located at the heel portions of the pre-form 48 perform the same function, but for a different reason. These heel portions must be inflated to a relatively great degree to fill the corners or heels of the finished container 65, as will be seen by a comparison between the shape of the pre-form 48 and the shape of the final container 65. The heating elements 46 insure that the heels of the pre-form are at a temperature capable of undergoing such inflation, and at a temperature most conducive to biaxial orientation at this critical portion of the final container. Maximum stretching for maximum strength is desired at the container heel area. The heat exchange elements insure orientation and stretching under the most advantageous conditions.

The heating elements 57 insure full sealing at the periphery of the mold inserts 55 and around the hand hole of the container 65.

Following blowing, side plates 23 are separated, opening the pre-form blow mold sections 30, the pre-form being retained on its blow tube 70, and the side plates 23 are indexed upwardly and to the right of their positions illustrated in FIG. 1, the right hand mold plates 23 having been previously moved to their positions illustrated in FIG. 1. Upon reclosure of the final blow mold sections 31 upon the pre-form 48, the blow pipe 70 is retracted, the left hand mold plates 23 move downwardly and to the left, the blow pipe 71 is inserted into the pre-form 70, and the pre-form is inflated by air through the blow pipe to the configuration of the final blow mold cavity 50.

During closure of the final blow mold sections 31 on the pre-form 48, the surfaces 55 engage the bulbous portion 49 of the pre-form 48 earlier formed at the surface 43, pinching shut a portion of the pre-form inwardly of the exterior surface thereof. Upon subsequent blowing, that pinched portion of the pre-form lying outwardly of the surfaces 56 is inflated to form the final handle. Thus, the surfaces 56 form a portion of the pre-form into a handle blank which is subsequently inflated to form the final handle. Since the material constituting the handle blank is at that temperature most conducive to biaxial orientation, aided by the heating element 46, the final resultant handle is formed under the most favorable circumstances for strength and integrity into the overall container. Further, all portions of the handle blank are located interiorly of the final blow mold cavity 50. No flash is formed at the exterior of the handle, and no finishing operation is necessary upon the handle. This flash-free condition of the handle is aided by the removal of the pinch-flash by the movement of the projection 63 into the recess 58 as heretofore described.

When this formation of the flash-free handle structure is combined with the tail-pulling structure of my earlier application and with the neck forming end re-forming structure also set forth in my earlier application, it will be appreciated that a completely flash-free, handled article can be made by free extrusion machines.

Turning now to the embodiment of the invention showing in FIGS. 8 through 11, a different type of preforming operation is illustrated as being performed between the blowing of the pre-form and the blowing of the pre-form into a final container.

In this embodiment of the invention, an overall blow molding mechanism as illustrated in FIG. 1 is again utilized, but need not be described in detail. As shown in FIG. 8, the pre-form blow mold sections 80 are of a different configuration than those earlier described. More specifically, the pre-form mold sections 80 cooperate to define an interior cavity 81 of simple configuration having a rounded bottom terminating in pinching portions 82 forming a removable tail 83, this tail being removable from the pre-form 84 as heretofore described.

A conventional blow pipe 70 as earlier described is utilized to blow the pre-form 84 to the configuration of the mold cavity 81, the pre-form 84 having a rounded bottom 84a. Of course, the pre-form mold sections 80 can be mounted on the side plates 23 as heretofore described and go through the same motions as earlier described.

In FIG. 9, there is illustrated a final blow mold having sections 85 cooperatively defining an interior cavity 86 which conforms to the shape of the final bottle, this mold cavity having a convex bottom 87 conforming to the bottom of the bottle as completely blown. As illustrated in FIG. 9, the bottle to be formed is a conventional, nonhandled container, although handled ware can also be made by the procedures heretofore described in detail.

As illustrated in FIG. 9, following the transfer of the pre-form to the final blow mold sections 85, the bottom 84a of the pre-form 84 is positioned well above the bottom 87 of the mold cavity 86. Next, an elongated blow pipe 90 is inserted into the pre-form to finish forming the neck, as desired. Alternatively, if desired, this blow tube 90 may be of the design described in my earlier application. However, the blow tube 90 has a bottom 91 which is slightly concave with radiused corners, the bottom 91 of the blow tube conforming generally to the bottom convex surface 87 of the mold cavity 86. This blow tube 90 is inserted into the pre-form 94 until it engages the bottom 84a of the pre-form, and the blow tube is then further inserted into the final blow mold sections 85 until the tube-preform engagement carries the bottom 84a of the pre-form 84 into contact with, or at least adjacent to, the bottom surface 87 of the final blow mold. This further insertion of the blow tube 90 is illustrated in FIG. 10 of the drawings.

The contact between the blow tube 90 and the pre-form 84 stretches the pre-form axially to substantially the full length of the final blow mold sections 84. The blow tube 90 is provided with an air outlet opening 92 which is located somewhere along the length of the blow tube 90 which is enclosed within the final blow mold sections 85 and within the pre-form 84. After the pre-form 84 has been stretched, air under pressure is introduced through the air outlet 92 in the blow tube to inflate the pre-form to the configuration of the final mold, as shown in FIG. 11.

Since the pre-form 84, at the time of blowing, is at a temperature conducive to orientation, the mechanical extension or stretching of the pre-form shape 84 by the blow tube 90 will orient the pre-form vertically. This stretching under orientation conditions will materially increase the strength of the final blown article in a vertical direction. Such strength is often critical in containers, since this strength is directly reflected in the capability of the bottles to withstand "top loading" or stacking. Where bottles or other containers must be stacked vertically in a warehouse, in a delivery truck, or even in a dispensing machine, substantial vertical loads imposed by superimposed filled bottles must be withstood. By orienting vertically, it has been found that these top loading forces can be tolerated to a degree unobtainable in a container which is simply biaxially oriented, even though the overall container strength may be greatly increased by such biaxial orientation.

In FIGS. 12 through 15, another embodiment of the invention is illustrated wherein the top loading capability of the bottle is increased in a different way.

Figure 12:
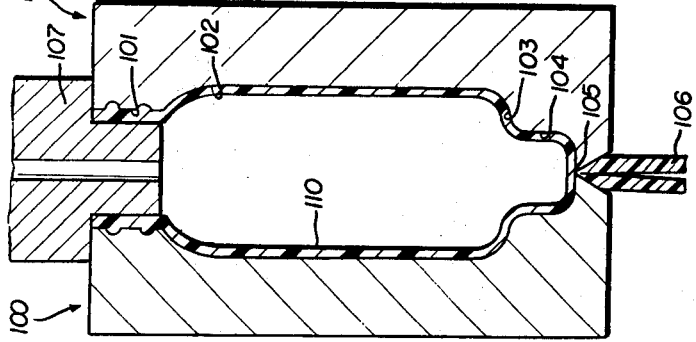

As shown in FIG. 12, the pre-form blow mold sections 100 are of somewhat different design. These pre-form blow mold sections 100 include an upper finish-defining portion 101, a generally cylindrical body-defining portion 102, and a lower restricted portion. This lower restricted portion is defined by inwardly projecting surfaces 103 merging into vertical cylindrical portions 104 of substantially less diameter than the body portion 102, these portions 104 being located immediately above the tail-pinching projections 105 of the pre-form blow molds. The blow mold sections 100 are utilized in conjunction with a machine as illustrated in FIG. 1 of the drawings, and substantially the same preforming movements are involved.

Upon closure of the blow mold sections 100 upon the extruded tubular parison, the pinching projections 105 form the pinched tail portion 106, forming the tube into a blowable bubble. Of course, the pinched tail 106 can be removed as earlier described. Alternatively, the tail may be left upon the pre-form. Next, a blow tube 107 is inserted into the tubular parison after it is cut from the orifice, and the parison is inflated to form the pre-form 110 to the configuration of the blow mold section 100.

Figure 15:
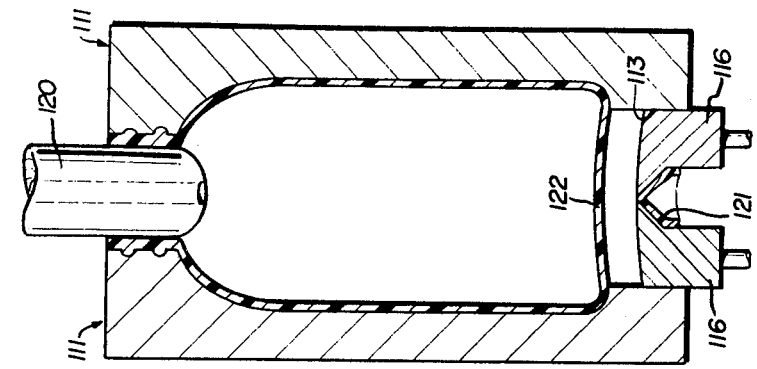
Figure 14:
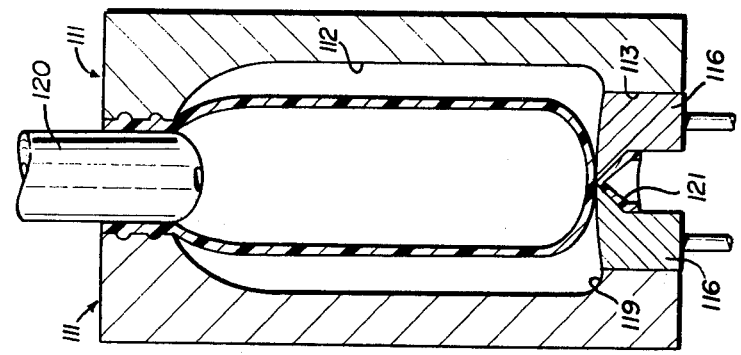
Figure 13:
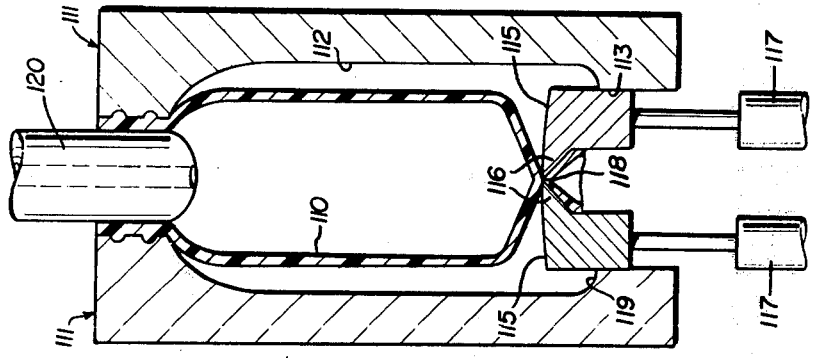

Following the formation of the pre-form 110, the pre-form is enclosed within the final blow mold sections 111. These blow mold sections 111 are illustrated in FIGS. 13 to 15 as including simply an interior mold cavity of generally cylindrical shape and indicated generally at 112. The bottom of the mold cavity 112 is open to provide a cylindrical passage 113 therethrough, and a pair of relatively movable pre-form-engaging jaws 115 project through this opening 113.

These pre-form-engaging jaws 115 are illustrated only schematically in the drawings, but it will be understood that these jaws are keyed or otherwise connected to the mold sections 111 for relative vertical motion but for opening and closing movement therewith. In other words, each mold section 111 carries a jaw 115 for opening and closing motion therewith and for relative vertical displacement. The jaws 115 are provided with complimentary inwardly projecting pinching surfaces 116 which, when the blow mold sections 111 are closed, move with the mold sections into engagement with the reduced lower portion of the pre-form 110 against the surfaces 104 of the pre-form molds 100.

The engaging elements 115 are jointly vertically movable by means of cylinders 117 or other suitable actuating mechanisms.. It will be readily understood that, when the final blow mold sections 111 are closed, the elements 115 are in their raised positions, and closure of the blow mold sections 111 engage the elements 115 with the pre-form 110 adjacent the lower end thereof. Following closure of the blow mold sections 111 and pinching of the pre-form 110 shut at 118, the elements 115 are retracted downwardly by the cylinders 117 to the positions illustrated in FIG. 4 of the drawings.

The upper surfaces of the elements 115 now form a continuation of the bottom-defining portions 119 of the final blow mold cavity 112. Air is then introduced into the vertically stretched pre-form 110 through an upper blow pipe 120 and the article is blown to its final configuration as shown in FIG. 15. Following this blowing, the "tail" formed beneath the pinch line 118 and indicated at 121 is then removed by simply actuating the gripping elements 115 further downward, while the blown article is still supported in the final blow mold sections 111. The resultant bottle has a conventional concave bottom surface 122 which is flash-free.

It will be readily appreciated that, once again, the pre-blown shape 110 has been thermally conditioned during blowing and during retention within the preblow mold sections 100 to be at that temperature most conducive to orientation. The stretching which occurs during performance of the step illustrated by the transition from FIG. 13 to FIG. 14 thus stretches the parison and vertically orients the thermo-plastic material constituting the preblown shape. Upon blowing, additional biaxial orientation is, of course, obtained, but the vertical orientation of the material is substantially increased. The same top loading capability is obtained by the method illustrated in FIGS. 12 through 15 as has been earlier described in connection with the method described in FIGS. 8 through 11.

Thus, it will be seen that the present invention provides an improved method of making a blown container in an apparatus which corresponds essentially to the well known free-extrusion blow molding machine. Further, the methods of the present invention are readily adaptable to machines of this character which are made and operated in accordance with my earlier, above-identified application, Ser. No. 103,624. The method of the present invention primarily performs additional steps intermediate the successive blowing steps of my earlier invention. In one embodiment of the present invention (as illustrated in FIGS. 1 through 7), these additional steps constitute the pinching of the pre-form prior to the final blowing to form a handle without the generation of excessive flash which must be removed. Those embodiments of my invention illustrated in FIGS. 8–11 and 12–15 perform additional stretching steps which increase the orientation of a bottle in a vertical direction to withstand those loads imposed on bottles during stacking, warehousing and the like. Of course, a combination of these methods may be utilized if desired to provide a handle container capable of withstanding such loads.

It will be understood that the overriding purpose of my earlier applications can also be obtained by following a method and by utilizing the apparatus of the present invention. In other words, the formation of the pre-form by initially blowing the tubular parison, and then blowing the pre-form to the final configuration, carries out the broader objects (1) of conditioning the pre-form by biaxial oxientation during the final blowing, (2) of cutting the overall cycle time in half, and (3) of obtaining a final article of greatly enhanced physical characteristics. The present invention essentially adds to this earlier invention the capability of forming handled ware from a freely extruded tube without generation of excessive amounts of flash and of increasing the top loading capability of articles formed on a free extrusion machine.

To best carry out the present invention and to obtain optimum orientation in the final article, it is preferred that the pre-form, at the time it is blown into the final article, have an average wall temperature for a crystalline polymer intermediate the crustalline melting point plus 20°F and the crystalline freezing point less 20°F or for an amorphous polymer the glass transition temperature plus or minus 25°F. Such temperatures for specific polymers are more specifically defined in my above identified earlier application.

What I claim is:

1. In an apparatus for making a blown plastic article from a thermoplastic tubular parison, including a pre-form blow mold closable on said parison, means for inflating the parison interiorly of the pre-form blow mold to a pre-form configuration of a size less than the size of the blown plastic article, a final blow mold having an interior cavity of a size and configuration conforming to that of the final blown article, means for closing said final blow mold on the pre-form, means for axially stretching the blown pre-form, and means for inflating the blown and stretched pre-form interiorly of the final blow mold cavity to the size and configuration of the final blown article.

2. In an apparatus for making a blown plastic article from an extruded tubular parison, a pre-form blow mold closable on said parison, means for inflating the parison interiorly of the pre-form blow mold to a pre-form configuration of a size less than the size of the blown plastic article, a final blow mold having an interior cavity of a size and configuration conforming to that of the final blown article, said final blow mold being closable onto the blown pre-form, means for axially stretching the blown pre-form interiorly of the final blow mold cavity, and means for inflating the blown and stretched pre-form interiorly of the final blow mold cavity to the size and configuration of the final blown article.

3. An apparatus for making a blown plastic article as defined in claim 2, wherein said means for stretching is a blow tube insertable axially into the blown pre-form as it is confined in the final blow mold and movable thereafter to stretch the blown pre-form to substantially the full axial extent of the final blow mold.

4. An apparatus for making a blown plastic article as defined in claim 2, wherein said stretching means comprises a pair of pinching projections engaging the blown pre-form, and means for moving said pinching projections through one wall of the blow mold to stretch the blown pre-form interiorly of the blow mold to the full axial extent of the final blow mold interior cavity.

* * * * *